No. 640,595. Patented Jan. 2, 1900.
M. F. STADTMULLER.
UNION.
(Application filed Apr. 27, 1899.)
(No Model.)
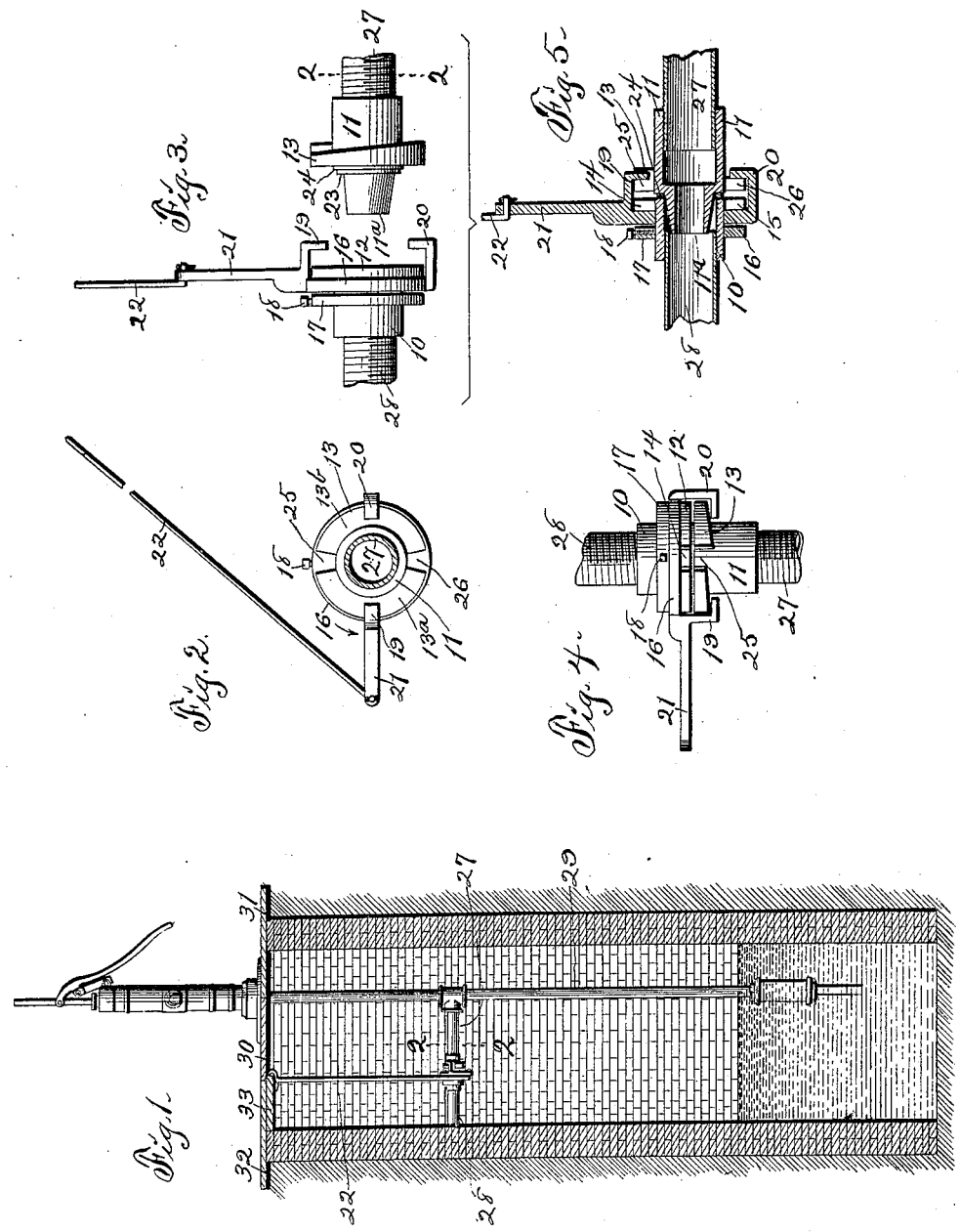

UNITED STATES PATENT OFFICE.

MAX F. STADTMULLER, OF POMEROY, IOWA.

UNION.

SPECIFICATION forming part of Letters Patent No. 640,595, dated January 2, 1900.

Application filed April 27, 1899. Serial No. 714,681. (No model.)

*To all whom it may concern:*

Be it known that I, MAX F. STADTMULLER, a citizen of the United States of America, and a resident of Pomeroy, Calhoun county, Iowa, have invented certain new and useful Improvements in Unions, of which the following is a specification.

The object of my invention is to provide improved means for coupling the adjacent ends of pipes or rods in alinement without rotating either of said pipes or rods and performing such operation of coupling quickly, conveniently, and with rigidity, the coupling or union being susceptible of instantaneous and convenient detachment.

My invention consists in the construction, arrangement, and combination of elements hereinafter set forth, pointed out in my claims, and illustrated by the accompanying drawings, in which—

Figure 1 is an elevation illustrating the mounting of a pump in a well, the pump being connected by my improved union to a lateral discharge-pipe. Fig. 2 is a cross-section on the indicated line 2 2 of Figs. 1 and 3. Fig. 3 is a detail side elevation of the union detached. Fig. 4 is a plan of the union connected. Fig. 5 is a longitudinal section of the union connected.

In the construction of the device as shown the numeral 10 designates one member, and 11 the other member, of a two-part union. The member 10 is formed with a peripheral flange 12 on one end portion, and the member 11 is formed with a peripheral flange 13 on its central portion of approximately the same diameter as the flange 12. Notches 14 15 are formed in and radially of the flange 12 and diametrically divide said flange into two parts. A clamp-collar 16 is loosely mounted on the member 10 in sliding contact with the flange 12, and a retaining-collar 17 is mounted on said member in sliding contact with the face of the clamp-collar opposite the flange 12, which collar 17 is locked to the member by a set-screw 18. Clamp-hooks 19 20 are formed on and project laterally from the clamp-collar 16 and are turned inwardly at right angles at their inner ends. The lateral or free end portions of the clamp-hooks 19 20 are of such length as to pass freely through the notches 14 15 in the flange 12 during the operation of mounting the clamp-collar on the member 10. An arm 21 is formed on and extends radially from the clamp-collar 16 and is apertured in its extremity for the reception of an operating-rod 22. The member 11 of the union is formed with a shoulder 23 adjacent the plane face of the flange 13, and a gasket or washer 24, of rubber, leather, or other suitable material, is mounted on said shoulder and in contact with the flange. The inner end portion $11^a$ of the member 11 is tapered and of such size as to enter the flanged end of the member 10 longitudinally. Notches 25 26 are formed in and radially of the flange 13 and diametrically divide said flange into two parts. The notches 25 26 are of such size and shape as to permit the passage therethrough of the inturned ends of the hooks 19 20 during the operation of mounting the reduced end portion $11^a$ of the member 11 in the flanged end of the member 10. The outer faces $13^a$ $13^b$ of the flange 13 are oppositely inclined, Figs. 3, 4, and 5, and are arranged for sliding contact by the inturned ends of the hooks 19 20 in the revolution of the clamp-collar 16. The outer end portion of the member 11 is interiorly screw-threaded to receive the terminal of a pipe 27, and the outer end portion of the member 10 is interiorly screw-threaded to receive the initial end of a pipe 28.

In Fig. 1 I have shown the pipe 27 affording communication between a pump-tube 29 and the member 11 of the union and the pipe 28 affording communication between the member 10 of the union and leading laterally therefrom, the pump-tube being mounted in a well and supported on a platform 30, surmounting the well. One portion 31 of the platform 30 is removable and replaceable beneath the base of the pump, and when said portion is removed the pump may be moved laterally slightly and lifted from the well upon the uncoupling of the union connecting the pipes 27 28. Another portion 32 of the platform 30 is provided, and a cleat 33 thereon, formed with a notch in one corner, has one margin extended beneath the platform 30 to retain said portion in position, as shown in Fig. 1, until such time as it may be manually removed. The pipe 28 leads from the union to a tank or other place of discharge of water from the pump and is stationary. The union member 10 is rigidly screwed on the pipe 28 after the clamp-collar and retaining-collar have been mounted on the member. The pipe 27 is mounted on the pump-tube and the union member 11 rigidly screwed on said pipe. The pump-tube is then inserted in the well and positioned with the pipe 27 in alinement with the pipe 28, the member 11 approached to the member 10, and the portion 11ª thereof inserted in the flanged end of the member 10. The clamp-collar is held by the rod 22 in such position that the hooks 19 20 pass through the notches 25 26, and then the rod is depressed, depressing the arm 21 and revolubly moving the clamp-collar in the direction of the arrow in Fig. 2. In the revolution of the clamp-collar the clamp-hooks thereon engage the inclined faces of the flange 13 and draw said flange and the member 11 close and tight to the flange 12 and member 10, the gasket 24 on the shoulder 23 forming a tight joint between the members. When the rod has depressed the arm into the position shown in Fig. 2, the portion 32 of the platform is positioned, as shown in Fig. 1, to hold said rod against vertical movement, and any wear of the union or its gasket is compensated by further downward movement of the arm and further revolution of the clamp-collar under the gravity of the arm and rod. The portion 31 of the platform may now be positioned to complete the platform and close the well.

When it is desired to remove the pump for repairs, cleaning, or substitution, the portion 32 of the platform is removed, the rod 22 drawn upwardly, lifting the arm 21 and revolving the clamp-collar until the hooks register with the notches 25 26, and then the member 11 redrawn from the member 10 and the pump-tube lifted out, carrying with it the pipe 27 and member 11.

The union above described may be employed to connect pipes or rods independent of any pump or other mechanism, and I have illustrated it in connection with a pump that its advantages in use may be apparent. The union also may be employed without the rod 22, said rod being illustrated and described to demonstrate the convenience of employing this union below the surface of the ground or in places more or less inconvenient of access.

I claim as my invention—

1. In a union composed of separable members, each having an outer flange formed with notches, a clamp-collar loosely mounted upon one of the members and having hooks passed through the notches of the flange thereof and adapted to pass through the notches in the flange of the other member, and a retaining-collar applied to the member bearing the clamp-collar and holding the latter in place, substantially as described.

2. A union composed of separable members having flanges formed with corresponding notches, the portions of one of the flanges formed by the notches having their outer faces inclined, a clamp-collar mounted upon the member matching with the one having the flange-sections formed with inclined faces, and having hooks to pass through the notches of both flanges and ride upon the inclined faces, and a retaining-collar for holding the clamp-collar in place, substantially as described.

3. The union formed in separable sections, the notched flange on each section, the clamp-collar on one section, the hooks on the collar arranged and so shaped as to engage one of the flanges, the retaining-collar and the arm on the clamp-collar, in combination with pipes or rods screw-seated in the outer ends of the sections.

4. The union comprising telescoping sections, mating flanges on said sections, one of which flanges has inclined outer faces, a clamp-collar mounted for revolution on the receiving member, an arm on the collar, an actuating-rod attached to said arm, a retaining-collar on the receiving-section, hooks on the clamp-collar arranged and so shaped as to engage the inclined outer faces of the flange and means for mounting said sections on pipes.

Signed by me at Pomeroy, Iowa, this 13th day of April, 1899.

MAX F. STADTMULLER.

Witnesses:
 OLIVER TALL,
 L. O'HAIRE.